United States Patent
Milne et al.

(10) Patent No.: US 12,477,285 B2
(45) Date of Patent: Nov. 18, 2025

(54) TRANSMITTING AUDIO STREAMS TO AUDITORY DEVICES BASED ON USER PREFERENCES

(71) Applicant: Sony Group Corporation, Tokyo (JP)

(72) Inventors: James R. Milne, Romona, CA (US); Andrew Estrada, Escondido, CA (US)

(73) Assignee: SONY GROUP CORPORATION, Tokyo (JP)

(*) Notice: Subject to any disclaimer, the term of this patent is extended or adjusted under 35 U.S.C. 154(b) by 240 days.

(21) Appl. No.: 18/141,678

(22) Filed: May 1, 2023

(65) Prior Publication Data

US 2024/0373174 A1 Nov. 7, 2024

(51) Int. Cl.
*H04R 25/00* (2006.01)
*G06F 3/0482* (2013.01)
*G06F 3/04847* (2022.01)
*G06F 16/635* (2019.01)

(52) U.S. Cl.
CPC ......... *H04R 25/505* (2013.01); *G06F 3/0482* (2013.01); *G06F 3/04847* (2013.01); *G06F 16/635* (2019.01); *H04R 2225/39* (2013.01); *H04R 2225/41* (2013.01)

(58) Field of Classification Search
CPC ...... G06F 3/0482; G06F 3/04847; G06F 3/16; G06F 3/165; G06F 16/635; H04L 67/306; H04R 2225/39; H04R 2225/41; H04R 2225/55; H04R 2227/003; H04R 2420/07; H04R 25/00; H04R 25/505; H04R 27/00; H04W 4/80
USPC ........................................ 381/23.1, 312, 314
See application file for complete search history.

(56) References Cited

U.S. PATENT DOCUMENTS

| | | | |
|---|---|---|---|
| 10,687,145 | B1 | 6/2020 | Campbell |
| 2013/0209073 | A1 | 8/2013 | Carvajal |
| 2014/0193007 | A1 | 7/2014 | Solum |
| 2015/0339096 | A1 | 11/2015 | Lakshminarayanan |
| 2017/0142484 | A1 | 5/2017 | Jeon |

(Continued)

OTHER PUBLICATIONS

Sony, Headphones Connect Help Guide, Feb. 19, 2018, https://web.archive.org/web/20180219153214/https://helpguide.sony.net/mdr/hpc/V1/en/ print.pdf (Year: 2018).*

(Continued)

*Primary Examiner* — Antim G Shah
(74) *Attorney, Agent, or Firm* — Trellis IP Law Group, PC

(57) ABSTRACT

A computer-implemented method includes pairing a first auditory device associated with a first user with an audio source. The method further includes generating a first user profile for the first user that includes first user preferences for streaming a first audio stream from the audio source to the first auditory device. The method further includes pairing a second auditory device associated with a second user with the audio source. The method further includes generating a second user profile for the second user. The method further includes determining, with the audio source, that the first auditory device and the second auditory device are within a proximity range of the audio source. The method further includes transmitting the first audio stream to the first auditory device based on the first user preferences and the second audio stream to the second auditory device based on the second user preferences.

19 Claims, 7 Drawing Sheets

(56) References Cited

U.S. PATENT DOCUMENTS

2017/0238103 A1* 8/2017 Gehring .................. H04W 4/80
 381/23.1
2019/0018644 A1 1/2019 Kovacevic

OTHER PUBLICATIONS

Anonymous: "Sony Headphones Connectz—About the "Sony Headphones Connect" Dashboard", Mar. 29, 2023 (Mar. 29, 2023), pp. 1-4, XP093142054, Retrieved from the Internet:.

* cited by examiner

User Preferences: Presets — 425

- What type of audio do you want to prioritize? — 430
  - ☑ Standard
  - ☐ Music
  - ☐ News — 432
- Custom audio mode — 435
  - ☐ Option 1
  - ☑ Option 2
  - ☐ Option 3
- Balance preset — 440
  - ☐ Left
  - ☐ Equal
  - ☑ Right
- Bass preset — 445
  - ☑ Low
  - ☐ Medium
  - ☐ High
- Treble preset — 447
  - ☐ Low
  - ☑ Medium
  - ☐ High

FIG 4B

User Preferences: General — 400

- ☑ Preferred language: English ⌄ — 410
- ☐ Closed captioning — 411
- ☐ Audio descriptive services — 413
- ☐ Audio quality: Standard ⌄ — 415
- ☐ Flat Volume — 417
- ☐ Encryption — 419

Next: Presets — 423

TRANSMITTING AUDIO STREAMS TO AUDITORY DEVICES BASED ON USER PREFERENCES

BACKGROUND

Watching television can be difficult when multiple viewers have different audio needs. For example, some people may have difficulty hearing. Other people may be particularly sensitive to loud noises. A television may be configured for one person's preferences, but that does not solve the problem for the other people.

SUMMARY

A computer-implemented method includes pairing a first auditory device associated with a first user with an audio source. The method further includes generating a first user profile for the first user that includes first user preferences for streaming a first audio stream from the audio source to the first auditory device. The method further includes pairing a second auditory device associated with a second user with the audio source. The method further includes generating a second user profile for the second user that includes second user preferences for streaming a second audio stream from the audio source to the second auditory device, where the first user preferences include at least one different preference than the second user preferences. The method further includes determining, with the audio source, that the first auditory device and the second auditory device are within a proximity range of the audio source. The method further includes transmitting the first audio stream to the first auditory device based on the first user preferences and the second audio stream to the second auditory device based on the second user preferences.

In some embodiments, the method further includes determining that the first auditory device is a hearing aid and generating graphical data for displaying a user interface with suggested user preferences that optimize the first audio stream for hearing loss. In some embodiments, the method further includes determining that the first auditory device supports a type of audio and generating graphical data for displaying a user interface with suggested user preferences that optimize the first audio stream based on the first auditory device supporting the type of audio. In some embodiments, where the first user preferences associated with the first user profile include at least one preference selected from the group of a language, closed captioning, audio descriptive services, a quality of audio, spatial audio, flat volume, a maximum volume level, one or more presets, and combinations thereof. In some embodiments, the one or more presets include at least one preset selected from the group of a standard audio mode, a theater audio mode, a music audio mode, a news audio mode, a custom audio mode, a balance preset, a bass preset, a treble preset, and combinations thereof. In some embodiments, determining that the first auditory device is within the proximity range is based on determining that the first auditory device is less than a predetermined distance threshold from the audio source. In some embodiments, the method further includes determining that the second user preferences are modified to match the first user preferences and transmitting the first audio stream and the second audio stream as a broadcast stream based on the second user preferences matching the first user preferences.

In some embodiments, determining that the first auditory device is within the proximity range is based on sensor data from at least one sensor selected from the group of an infrared sensor, a light-emitting diode (LED), radar, a camera sensor, an ultrasonic sensor, and combinations thereof. In some embodiments, the first audio stream and the second audio stream are transmitted using at least one communication method selected from the group of Bluetooth LE Audio, Bluetooth, Wi-Fi, ultra-wide band (UWB), near-field communication (NFC), and combinations thereof. In some embodiments, the method further includes determining that the first auditory device is outside the proximity range of the audio source for an amount of time that meets a predetermined time threshold and ending transmission of the first audio stream based on the amount of time meeting the predetermined time threshold. In some embodiments, the method further includes generating graphical data for displaying a user interface that includes options for configuring the first user preferences, where the first user profile is generated on a user device associated with the first user. In some embodiments, the method further includes determining that the first user overrides one or more of the first user preferences a predetermined threshold number of times and modifying the one or more of the first user preferences to correspond to changes made by the first user.

In some embodiments, a user device includes one or more processors and logic encoded in one or more non-transitory media for execution by the one or more processors and when executed are operable to: pair a first auditory device associated with a first user with an audio source, generate a first user profile for the first user that includes first user preferences for streaming a first audio stream from the audio source to the first auditory device, pair a second auditory device associated with a second user with the audio source, generate a second user profile for the second user that includes second user preferences for streaming a second audio stream from the audio source to the second auditory device, where the first user preferences include at least one different preference than the second user preferences, determine, with the audio source, that the first auditory device and the second auditory device are within a proximity range of the audio source, and transmit the first audio stream to the first auditory device based on the first user preferences and the second audio stream to the second auditory device based on the second user preferences.

In some embodiments, the logic is further operable to determine that the first auditory device is a hearing aid and generate graphical data for displaying a user interface with suggested user preferences that optimize the first audio stream for hearing loss. In some embodiments, determining that the first auditory device is within the proximity range is based on determining that the first auditory device is less than a predetermined distance threshold from the audio source.

In some embodiments, software is encoded in one or more computer-readable media for execution by the one or more processors on a user device and when executed is operable to: pair a first auditory device associated with a first user with an audio source, generate a first user profile for the first user that includes first user preferences for streaming a first audio stream from the audio source to the first auditory device, pair a second auditory device associated with a second user with the audio source, generate a second user profile for the second user that includes second user preferences for streaming a second audio stream from the audio source to the second auditory device, where the first user preferences include at least one different preference than the second user preferences, determine, with the audio source, that the first auditory device and the second auditory device are within a proximity range of the audio source, and transmit the first audio stream to the first auditory device based on the first user preferences and the second audio stream to the second auditory device based on the second user preferences.

In some embodiments, the software is further operable to determine that the first auditory device is a hearing aid and generate graphical data for displaying a user interface with suggested user preferences that optimize the first audio stream for hearing loss. In some embodiments, the first user preferences associated with the first user profile include at least one preference selected from the group of a language, closed captioning, audio descriptive services, a quality of audio, spatial audio, flat volume, a maximum volume level, one or more presets, and combinations thereof. In some embodiments, the one or more presets include at least one preset selected from the group of a standard audio mode, a theater audio mode, a music audio mode, a news audio mode, a custom audio mode, a balance preset, a bass preset, a treble preset, and combinations thereof. In some embodiments, determining that the first auditory device is within the proximity range is based on determining that the first auditory device is less than a predetermined distance threshold from the audio source.

The technology advantageously personalizes audio streams for different users while the users are all watching the same program to ensure that the audio streams are best designed for each user to be able to hear the program. In addition, the technology may customize the audio streams for users with hearing damage based on the type of auditory device and/or hearing profiles associated with the users.

A further understanding of the nature and the advantages of particular embodiments disclosed herein may be realized by reference of the remaining portions of the specification and the attached drawings.

BRIEF DESCRIPTION OF THE DRAWINGS

FIG. 4A is an example user interface for configuring user preferences according to some embodiments described herein.

FIG. 4B is an example user interface for configuring presets on a television according to some embodiments described herein.

DETAILED DESCRIPTION OF EMBODIMENTS

Figure 1:
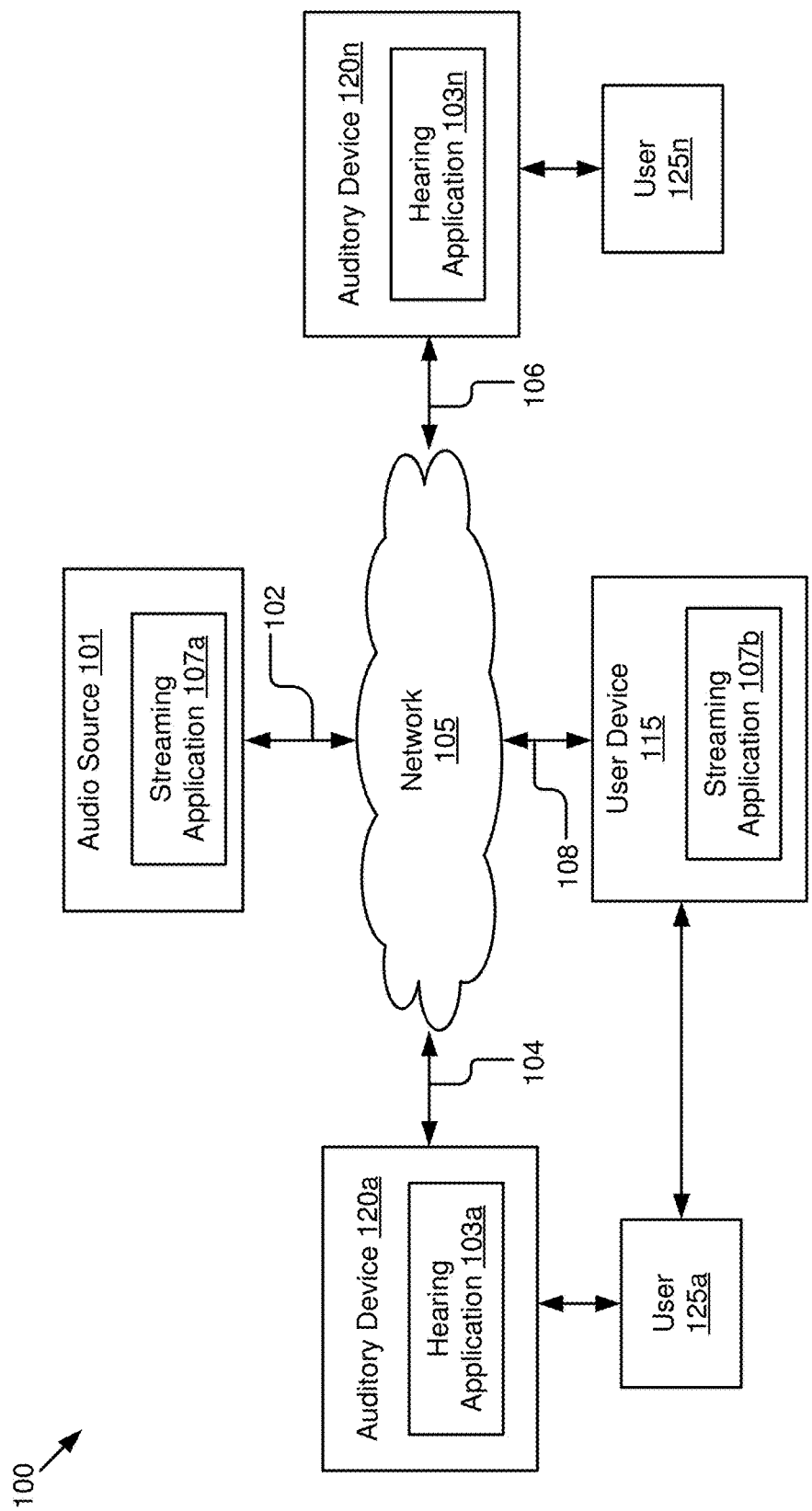
FIG. 1 is a block diagram of an example network environment according to some embodiments described herein.

FIG. 1 illustrates a block diagram of an example environment 100. In some embodiments, the environment 100 includes auditory devices 120, a user device 115, and an audio source 101. A first user 125a may be associated with the user device 115 and a first auditory device 120a. A subsequent user 125b may be associated with a subsequent auditory device 120n. In FIG. 1 and the remaining figures, a letter after a reference number, e.g., "103a," represents a reference to the element having that particular reference number (e.g., a streaming application 107a stored on the first auditory device 120a). A reference number in the text without a following letter, e.g., "103," represents a general reference to embodiments of the element bearing that reference number (e.g., any hearing application).

In some embodiments, the environment 100 may include other servers or devices not shown in FIG. 1. For example, the environment 100 may include a server that stores user profiles, additional auditory devices 120, additional audio sources 101, and/or additional user devices 115.

The audio source 101 may include a processor, a memory, and network communication hardware. In some embodiments, the audio source 101 is a television or a portable computing device (e.g., a laptop, a tablet, a phone). The audio source 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology.

In some embodiments, the audio source 101 includes a streaming application 107a. In some embodiments and with user consent, the streaming application 107a on the audio source 101 maintains a user profile associated with a user 125.

The auditory device 120 may include a processor, a memory, a speaker, and network communication hardware. The auditory device 120 may be a hearing aid, earbuds, or headphones. The auditory device 120 includes a hearing application 103. For example, the first auditory device 120a includes hearing application 103b and the subsequent auditory device 120n includes hearing application 103b.

The first auditory device 120a is communicatively coupled to the network 105 via signal line 104 and the subsequent auditory device 120n is communicatively coupled to the network 105 via signal line 106. Signal lines 104 and 106 may be a wireless connection, such as Wi-Fi®, Bluetooth®, or other wireless technology.

In some embodiments, the streaming application 107a on the audio source 101 pairs with the first auditory device 120a. For example, the first user 125a may request that the audio source 101 pair with the first auditory device 120a via Bluetooth, ultra-wide band (UWB), near-field communication (NFC), Wi-Fi, or another wireless communication method. The streaming application 107a may generate a first user profile for the first user that includes first user preferences for streaming a first audio stream from the audio source 101 to the first auditory device 120a. For example, the first user may prefer that the first audio is streamed in English with a standard quality of audio.

The audio source 101 may additionally pair with a second auditory device, such as the subsequent auditory device 120n in FIG. 1. The streaming application 107a may generate a second user profile for the second user (e.g., the subsequent user 125n) that includes second user preferences for streaming a second audio stream from the audio source 101 to the second auditory device. The first user preferences may include at least one different preference than the second user preferences. For example, the second user preferences may include a high quality of audio and a preferred volume level.

The streaming application 107a may transmit the first audio stream to the first auditory device 120a based on the first audio preferences and the second audio stream to the second auditory device based on the second user preferences.

In some embodiments, the hearing application 103a receives the first audio stream from the streaming application 107a and converts the first audio stream into audio that is generated by the first auditory device 120a. In some embodiments, the hearing application 103a maintains a hearing profile for the user and customizes the audio based on the user's hearing abilities and/or preferences. For example, the first auditory device 120a may be a hearing aid for the first user 125a who has experienced hearing loss. The hearing application 103a may receive the first audio stream from the streaming application 107a and generates audio that is customized based on the hearing loss to help the first user 125a hear better. In some embodiments, the streaming application 107a receives the hearing profile and customizes the user preferences based on the hearing profile to improve the sound quality for the user based on the user's hearing loss.

The user device 115 may be a computing device that includes a memory, a hardware processor, and a streaming application 107b. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the audio source 101 and the auditory device 120.

In the illustrated implementation, user device 115 is coupled to the network 105 via signal line 108. Signal line 108 may be a wireless connection, such as Wi-Fi®, Bluetooth®, or other wireless technology.

In some embodiments, the first user device 115a includes a streaming application 107b with code and routines operable to connect with the audio source 101 to receive a signal, such as by making a connection via Bluetooth® or Wi-Fi®. The streaming application 107b generates graphical data for displaying a user interface for the first user 125a to add first user preferences for streaming. In some embodiments, the streaming application 107b receives an instruction from a server (not shown) to generate the user interface. For example, the audio source 101 may display an activation code and a website. The first user 125a may use a browser on the first user device 115a to display the website and enter the activation code. The first user 125a may then provide user preferences on the first user device 115a, which may be less cumbersome than navigating menus on the audio source 101.

Figure 2:
FIG. 2 is an illustration of example auditory devices according to some embodiments described herein.

FIG. 2 illustrates example auditory devices. Specifically, FIG. 2 illustrates a hearing aid 200, headphones 225, and earbuds 250. In some embodiments, each of the auditory devices is operable to connect with a different auditory device. The auditory devices may be manufactured by Sony or other companies.

Example Computing Device 300

Figure 3:
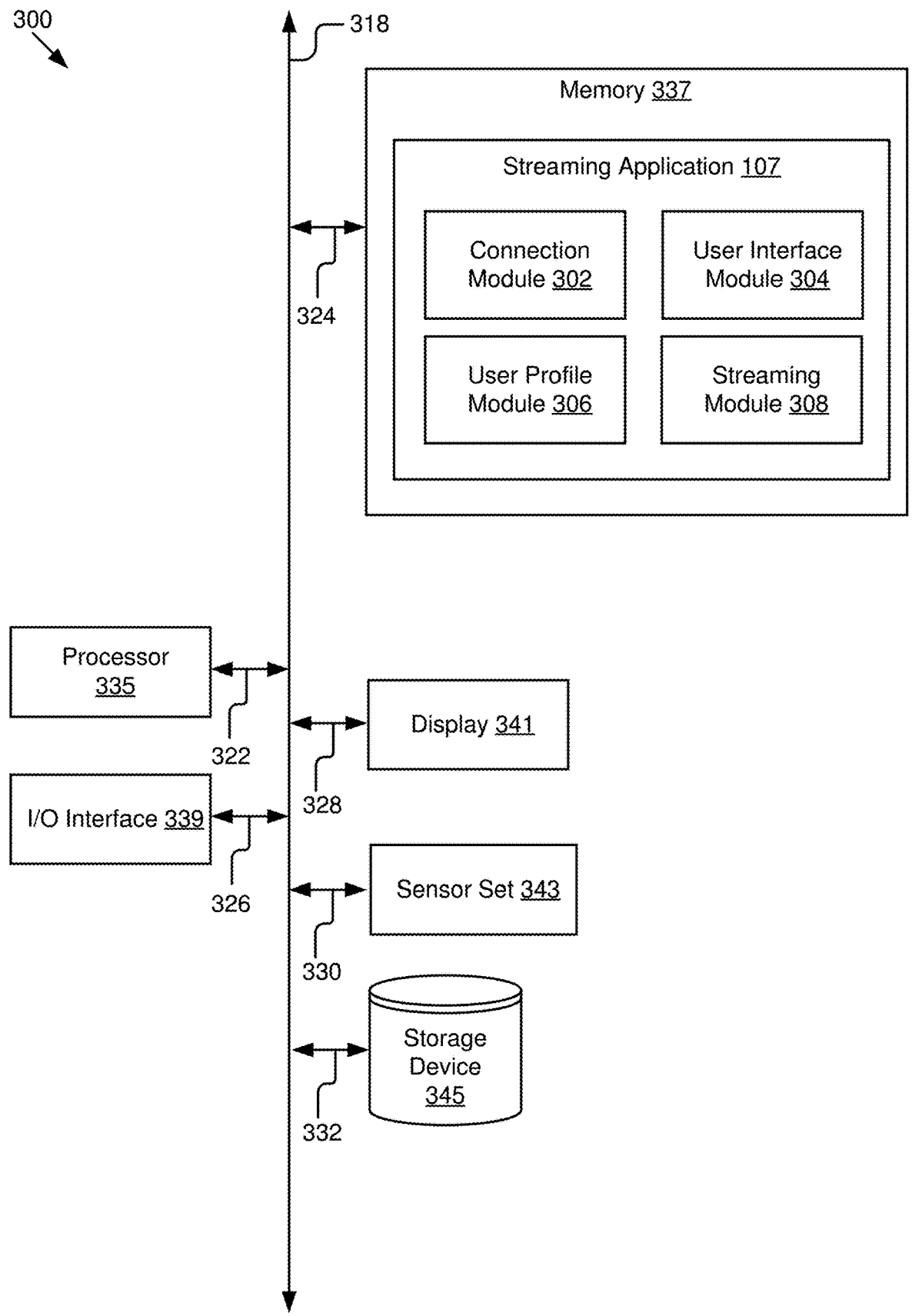
FIG. 3 is a block diagram of an example computing device according to some embodiments described herein.

FIG. 3 is a block diagram of an example computing device 300 that may be used to implement one or more features described herein. The computing device 300 can be any suitable computer system, server, or other electronic or hardware device. In one example, the computing device 300 is the user device 115 illustrated in FIG. 1. In another example, the computing device 300 is the audio source 101 illustrated in FIG. 1.

In some embodiments, computing device 300 includes a processor 335, a memory 337, an Input/Output (I/O) interface 339, a display 341, a sensor set 343, and a storage device 345. The processor 335 may be coupled to a bus 318 via signal line 322, the memory 337 may be coupled to the bus 318 via signal line 324, the I/O interface 339 may be coupled to the bus 318 via signal line 326, the display 341 may be coupled to the bus 318 via signal line 328, the sensor set 343 may be coupled to the bus 318 via signal line 330, and the storage device 345 may be coupled to the bus 318 via signal line 332.

The processor 335 can be one or more processors and/or processing circuits to execute program code and control basic operations of the computing device 300. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 337 is typically provided in computing device 300 for access by the processor 335 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 335 and/or integrated therewith. Memory 337 can store software operating on the computing device 300 by the processor 335, including the streaming application 107.

The I/O interface 339 can provide functions to enable interfacing the computing device 300 with other systems and devices. Interfaced devices can be included as part of the computing device 300 or can be separate and communicate with the computing device 300. For example, network communication devices, storage devices (e.g., the memory 337 or the storage device 345), and input/output devices can communicate via I/O interface 339. In some embodiments, the I/O interface 339 can connect to interface devices such as input devices (keyboard, pointing device, touchscreen, microphone, sensors, etc.) and/or output devices (display 341, speakers, etc.).

In some embodiments, the I/O interface 339 implements a Bluetooth, Wi-Fi, or UWB protocol for processing, transmitting, and receiving wireless signals. For example, the wireless protocol may be Bluetooth, Bluetooth 5.0, Bluetooth 5.1, Bluetooth 5.2, Bluetooth 5.3, Bluetooth LE, Bluetooth Classic, Bluetooth LE Audio, Wi-Fi, and/or a proprietary standard created by the manufacturer of the auditory device.

The display 341 may connect to the I/O interface 339 to display content, e.g., a user interface, and to receive touch (or gesture) input from a user. The display 341 can include any suitable display device such as a liquid crystal display (LCD), light emitting diode (LED), or plasma display screen, cathode ray tube (CRT), television, monitor, touchscreen, or other visual display device.

The sensor set 343 includes one or more sensors that generate data that is used by the streaming application 107 to determine whether an auditory device is within proximity range of the audio source. The sensor data may be used by determining the time it take for a signal to return, the intensity of a returned signal, or a phase change of the returned signal. In some embodiments, the sensor set 343 includes one or more of an infrared sensor (IR), an LED, a camera sensor, an ultrasonic sensor, radar, or other sensors that generate sensor data that is used by the connection module 302 of the streaming application 107 to determine whether an auditory device is within proximity range of the computing device 300.

An IR sensor can be used to measure a distance to an object using a beam of IR light. In some embodiments, an IR LED emits the IR light that hits an object, which is reflected back at an angle. A light detector detects reflection of the IR light and based on the timing and angle of the light, the streaming application may determine the position and/or distance of the object.

In some embodiments, an LED uses time-of-flight sensors to measure the elapsed time from the emission of a wave pulse from the sensor to the movement it returns to the sensor after reflecting off an object.

A camera sensor can be used to capture images of a room and determine whether people are in the room based on the images.

An ultrasonic sensor can be used to measure a distance to an object using ultrasonic sound waves. In some embodiments, the ultrasonic sensor emits high-frequency sound waves. When the high-frequency sound waves hit an object, the sound waves are reflected back to the ultrasonic sensor. The connection module 302 of the streaming application 107 uses the return time of the sound wave to measure the distance between computing device 300 and the auditory device.

Radar can be used to measure a distance to an object using a transmitter that generates high-frequency electromagnetic waves, one or more antennas that transmit the electromagnetic wave and receive the wave, and a receiver that can be used to measure a distance to an object. The antenna transmits the electromagnetic wave until it hits an object. The wave is reflected back and detected by the antenna and used to determine the distance between the computing device 300 and the auditory device.

The storage device 345 stores data related to the streaming application 107. For example, the storage device 345 may store user preferences, etc.

Although particular components of the computing device 300 are illustrated, other components may be added or removed.

Example Streaming Application 107

In some embodiments, the streaming application 107 includes a connection module 302, a user interface module 304, a user profile module 306, and a streaming module 308. In some embodiments, the components of the streaming application 107 may be different depending on whether the computing device 300 is the user device 115 or the audio source 101 illustrated in FIG. 1. For example, if the computing device 300 is the user device 115 in FIG. 1, the streaming application 107 may include the user interface module 304. If the computing device 300 is the auditory device 120 in FIG. 1, the streaming application 107 may include all the modules illustrated in FIG. 3.

In some embodiments, the connection module 302 scans for broadcast identifiers and identifies auditory devices that are within a communication range of the computing device 300. In some embodiments, the connection module 302 determines that an auditory device is within the communication range if the auditory device is less than a predetermined distance threshold from the audio source. For example, the predetermined distance threshold may be five feet (10 feet, three feet, etc.) based on a default setting or a user preference.

In some embodiments, the predetermined distance threshold is based on a communication range of a particular communication protocol. For example, if the communication protocol is Bluetooth, the predetermined distance threshold may be less than 30 feet. If the communication protocol is Wi-Fi, the predetermined distance threshold may be less than 160 feet.

The connection module 302 determines whether the auditory device is previously recognized. For example, the connection module 302 may have previously bonded or paired with the auditory device. If the connection module 302 recognizes the auditory device, the connection module 302 may retrieve the user profile associated with the auditory device from local storage or from cloud storage.

If the connection module 302 does not recognize the auditory device, the connection module instructs the user interface module 304 to ask the user if the user wants to pair with the auditory device. In some embodiments, the connection module 302 provides information about the broadcast identifiers to the user interface module 304. The user interface module 304 may display the list of broadcast identifiers that are available. In some embodiments, the list of broadcast identifiers prioritizes broadcast identifiers corresponding to auditory devices that have previously been associated with the audio source 101.

In some embodiments, a user requests to make a connection with a particular auditory device through the user interface. For example, the user may recognize the manufacturer's name for the auditory device or the auditory device may have a unique description.

Once the connection module 302 determines that the user requests to connect with the auditory device, the connection module 302 transmits a request to connect via the I/O interface 339 to the auditory device. The connection may be a Bluetooth connection, a Bluetooth LE audio connection, a Wi-Fi connection, a UWB connection, an NFC connection, a proprietary connection produced by the manufacturer of the auditory device, or another type of wireless connection. The connection module 302 may maintain multiple connections using the same communication protocol for multiple auditory devices or use different communication protocols for different auditory devices.

The connection module 302 determines if an acknowledgement is received from the auditory device. If the acknowledgement is not received (e.g., if the acknowledgement is not received within a predetermined amount of time), the connection module 302 may halt the connection and go back to scanning for broadcast identifiers. If the connection module 302 receives the acknowledgement, the connection module 302 may subscribe to the connection. In some embodiments, the connection module 302 maintains an encrypted connection by default or by user selection. The encrypted connection may turn off when more than two people are part of the connection.

The connection module 302 determines whether to store the connection. For example, the user interface module 304 may generate graphical data for displaying a user interface that asks the user if they want to store the connection. The connection module 302 either stores the connection and starts the communication or, if the connection is not being stored, starts the communication.

In some embodiments, the connection module 302 determines whether an auditory device is within a proximity range of the audio source before the streaming module 308 transmits an audio stream to the auditory device. The proximity range may be less than the communication range because in order to receive the audio stream the user associated with the auditory device is expected to be close enough to the audio source that they can see the display 341.

In some embodiments, the connection module 302 determines that the auditory device is within a proximity range based on determining that the auditory device is less than a predetermined distance threshold from the audio source. The predetermined distance threshold may be different depending on the type of audio source. For example, the predetermined distance threshold may be 10 feet for a television, but only three feet for a tablet.

In some embodiments, the connection module 302 receives sensor data from one or more sensors in the sensor set 343 and uses the sensor data to determine whether the auditory device is within the proximity range. In some embodiments, the sensor set 343 includes one or more of an infrared sensor (IR), a light-emitting diode (LED), a camera sensor, an ultrasonic sensor, radar, or other sensors that generate sensor data.

The connection module 302 may use the sensor data by determining the time it take for a signal to return, the intensity of a returned signal, or a phase change of the returned signal. For example, the ultrasonic sensor may provide a transmission time and a return time of a sound wave to the connection module 302, which determines a distance based on the transmission time and the return time of the sound wave. The connection module 302 may determine whether the distance is within the predetermined distance threshold and, if so, instruct the streaming module 308 to transmit corresponding audio streams to the auditory devices. In some embodiments where the connection module 302 receives sensor data from the camera sensor, the connection module 302 may perform object identification to recognize when people are identifiable in the image and within proximity range based on being identifiable in the image.

The connection module 302 may maintain the connection until the user is done (e.g., the user indicates that the connection should be stopped) or the audio source is out of range. In some embodiments, the connection module 302 ends the connection when the auditory device is a distance greater than the proximity range, for example, by being more than the predetermined distance threshold from the audio source.

In some embodiments, the connection module 302 uses hysteresis to determine whether to end the connection based on a history of behavior. For example, the connection module 302 may determine that the auditory device is outside the proximity range of the audio source for an amount of time that meets a predetermined time threshold where the predetermined time threshold is based on past user behavior (e.g., if the auditory device is outside the proximity range for three seconds, then is within the proximity range, and then is outside the proximity range again, the auditory device is not expected to return to be within the proximity range), a predetermined time threshold defined by a user (e.g., 10 seconds), etc. If the amount of time meets the predetermined time threshold, the connection module 302 may end transmission of the audio stream.

The user interface module 304 may generate graphical data for displaying a user interface where the user provides input that the user profile module 306 uses to generate a user profile for the user. For example, the user may provide a username and password, input their name, and provide an identification of an auditory device (e.g., identify whether the auditory device is a hearing aid, headphones, or earbuds).

In some embodiments, the user interface includes an option for specifying a particular type of auditory device and a particular model that is associated with the user. For example, the hearing aids may be Sony C10 self-fitting over-the-counter hearing aids (model CRE-C10) or E10 self-fitting over-the-counter hearing aids (model CRE-E10). The identification of the type of auditory device is used for, among other things, determining how to configure sounds. For example, an inner-ear hearing aid will generate quieter sounds than over-the-ear headphones.

The user interface module 304 may generate graphical data for displaying a user interface that enables a user to make a connection between the computing device 300 and the auditory device. For example, the auditory device may be Bluetooth enabled and the user interface module 304 may generate graphical data for instructing the user to put the auditory device in pairing mode. The computing device 300 may receive a signal from the auditory device via the I/O interface 339 and the user interface module 304 may generate graphical data for displaying a user interface that guides the user to select the auditory device from a list of available devices.

The user interface module 304 generates graphical data for displaying a user interface with options for configuring user preferences. The user preferences may include a language, closed captioning, audio descriptive services, a quality of audio, spatial audio, a flat volume, a maximum volume level, and/or one or more presets. The language preference may result in the streaming module 308 providing a different language to the user than the original language that is being streamed. For example, a television program may be in English and the preferred language may be in Spanish. Selecting closed captioning may result in the audio source displaying closed captioning for the user. The audio descriptive services may be a form of narration that is used to provide information surrounding key visual elements in a program for the benefit of blind and visually-impaired users.

The quality of the audio may include high-quality audio, standard audio, and low-quality audio. In some embodiments, the quality of audio may include an option to automatically adjust the quality of the audio based on bandwidth capabilities or based on the capabilities of the audio device. For example, the streaming module 308 may detect a decrease in bandwidth and decrease the audio quality as a result. The spatial audio may include 360-degree digital surround sound. The flat volume may ensure that the volume is the same regardless of the program, the channel, when advertisements are played, etc. The maximum volume level may include the highest level of volume transmitted to the user. This may be particularly advantageous when the auditory device includes hearing aids because loud noises beyond the maximum volume level may cause physical pain.

In some embodiments, the presets include one or more of a standard audio mode, a theater audio mode, a music audio mode, a news audio mode, a custom audio mode, a balance preset, a bass preset, and/or a treble preset. The standard audio mode may balance treble and bass and be designed for audio associated with standard television programs. The theater mode may enhance treble and bass and be used for DVDs, Blu-ray discs, and high-definition television programs. The music audio mode may be designed for listening to music. The news audio mode may enhance vocals and may be designed for watching news broadcasts.

In some embodiments, the user interface includes an option to test various user preferences. For example, the maximum volume level may be tested by providing the user with different test sounds and/or a slider to determine the maximum volume level that the user is comfortable with. In another example, the custom audio mode preset may be configured by playing various sounds and asking the user to confirm their preferences for different settings. In yet another example, the balance preset, a bass preset, and/or a treble preset may be configured based on providing test sounds to a user and asking the user to confirm their preferred levels of balance, bass, and/or treble.

In some embodiments, the user interface module 304 generates graphical data for displaying a user interface for determining user preferences. FIG. 4A is an example user interface 400 for configuring user preferences. In this example, general user preferences are displayed. A user may select a preferred language box 405 to indicate a preferred language where the language can be changed by selecting the drop-down box 410. The user may additionally select a closed-captioning box 411 to indicate a preference for closed captioning, select an audio descriptive services box 413 to indicate a preference for a description of important visual elements in a scene, select an audio quality box 415 to indicate a preferred type of audio, a flat volume box 417 to indicate a preference for volumes to sound the same or similar, and an encryption box 419 to indicate that audio streams should be transmitted as encrypted audio. The audio quality box 415 may be modified by selecting the drop-down box 421 to see options including standard, high, low, and auto where auto modifies the audio quality based on a current bandwidth received by the audio source. Once the user is done with the general user preferences, the user can select the next button 423 to configure the presets.

FIG. 4B is an example user interface 425 for configuring presets on a television. In this example, a user may indicate that they want to prioritize a type of audio 430 by selecting one of the boxes. For example, the box for the standard setting may be selected by default, but prioritizing music or news may also be possible. In some embodiments, the user can listen to sample audio by selecting the button identifying the type of audio. For example, pressing the news button 432 causes the streaming module 308 to transmit an audio sample where speakers are prioritized over other types of audio.

Next, a user may customize an audio mode 435 by selecting buttons of different options to hear different audio configurations. A user may select a balance preset 440 that increases the volume on the left audio channel, both channels equally, or the right audio channel. A user may select the bass preset 445 by choosing between low bass, medium bass, or high base. A user may select the treble preset by choosing between low treble, medium treble, or high treble.

Figure 4D:
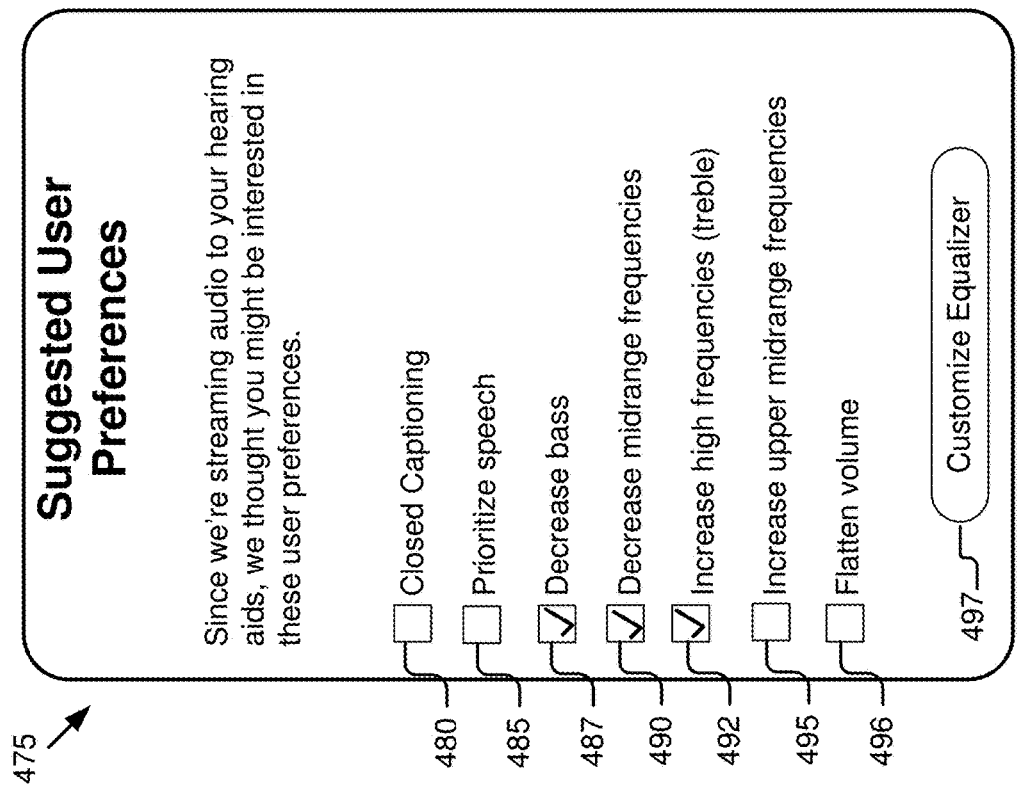
FIG. 4D is an example user interface with suggestions for a user with hearing aids according to some embodiments described herein.
Figure 4C:
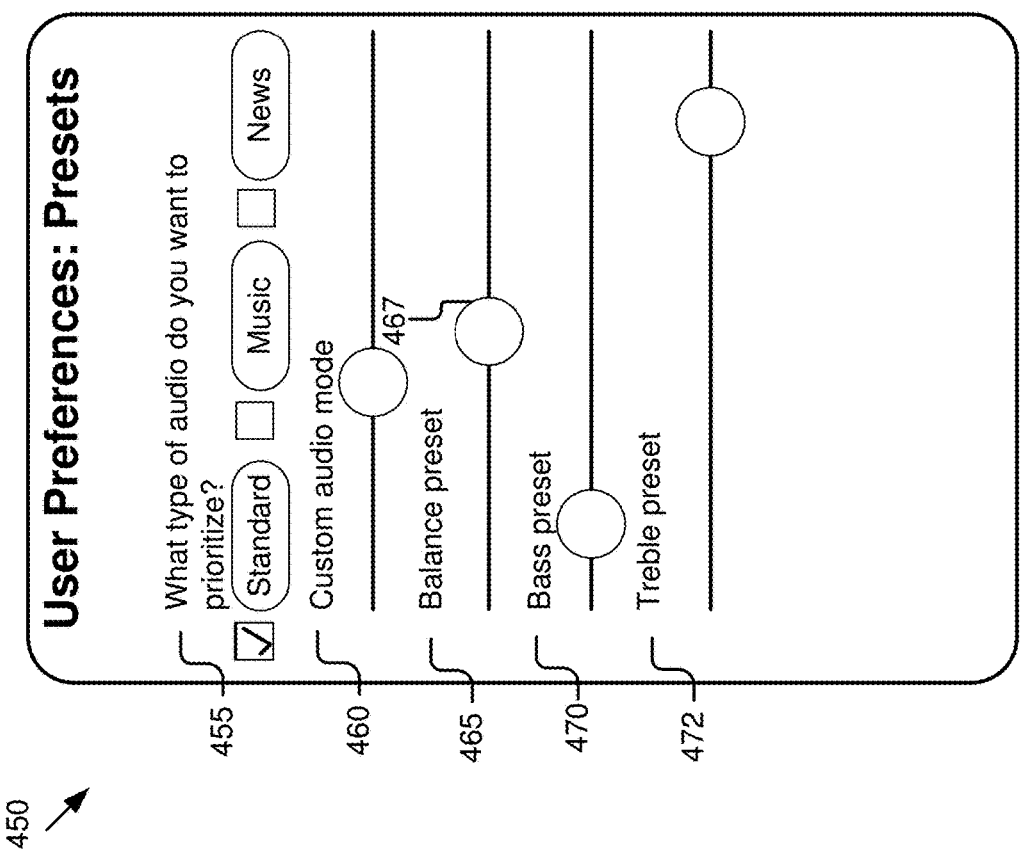
FIG. 4C is an example user interface for configuring presets on a user device according to some embodiments described herein.

FIG. 4C is an example user interface 450 for configuring presets on a user device where the user device may be a mobile device, a tablet, a laptop, etc. In some examples, a user may prefer to configure the user preferences on a user device because navigating different windows and options on a television screen may be cumbersome. As a result, FIG. 4C is an example of how configuring presets on a user device may look different than on a television as illustrated in FIG. 4B.

In this example, the user may indicate that they want to prioritize a type of audio 455 by selecting a box for standard, music, or news. The user may use a slider to select the ideal preset for custom audio mode 460, balance preset 465, bass preset 470, and/or treble preset 472. For example, the user may move slider 467 to determine whether they prefer to hear sound coming from a left audio channel, more of a mix of channels, or more from the right audio channel.

In some embodiments, the connection module 302 determines a type of auditory device that the audio source is connected to and, depending on the type of auditory device, the user interface module 304 generates suggested user preferences that optimize an audio stream based on the type of auditory device. For example, if the auditory device includes hearing aids, the user interface module 304 may suggest user preferences that optimize the audio stream for hearing loss. In some embodiments, the user interface module 304 may generate graphical data for displaying a user interface with suggested user preferences that optimize the audio stream based on the auditory device supporting the type of audio. For example, certain types of auditory devices may support higher quality audio, gaming audio, phone call audio, spatial audio, etc.

FIG. 4D is an example user interface 475 with suggestions for a user with hearing aids. In this example, the user interface 475 includes a box for selecting closed captioning 480, a box for prioritizing speech 485 (e.g., prioritizing speech over background noise, music, etc.), a box for decreasing bass 487, a box for decreasing midrange frequencies 490, a box for increasing high frequencies 492, a box for increasing upper midrange frequencies 495, and a box for flattening the volume 496. Depending on the type of hearing loss experienced by the user, they may experience hearing loss at different frequencies such that they do not experience hearing loss in the midrange frequencies, but do experience hearing loss in the high frequencies. As a result, the user may want to increase the high frequencies, which is also known as increasing the treble. Increasing the treble may make the audio sound brighter and more detailed. Flattening the volume may help a user with hearing loss because explosions and whispers will sound similar, which means that the user does not have to adjust the volume to hear all the soft sounds, which might make the loud sounds more painful. In some situations, a binary checkbox may be insufficient for the user to express their preferences. Instead, the user may want to further configure the audio by selecting the customize equalizer button 497 in order to modify more specific frequencies.

In some embodiments, the user profile module 306 receives a hearing profile for a user associated with an auditory device and generates suggested user preferences based in part on the hearing profile. The hearing profile may identify specific frequencies or bands where the user is experiencing hearing loss. The user interface module 304 may pre-populate the suggested user preferences illustrated in FIG. 4D based on the hearing profile. For example, the suggested user preferences may already include a checkmark for prioritizing speech for instances where the user has difficulty with hearing speech in crowded situations, a checkmark for increasing upper midrange frequencies for a user that experiences hearing damage in the upper midrange, a customized equalizer based on the hearing profile, etc.

The user profile module 306 generates a user profile that includes user preferences for each user based on information that the user inputs into the user interface. In some embodiments, the user profile module 306 modifies the user profile based on a hearing profile received from an auditory device. The user profile module 306 maintains a separate user profile for each user that is associated with a particular auditory device. In some embodiments, the user profile is also stored on one or more servers. Once the user profile module 306 creates the user profile or updates the user profile, the user profile module 306 may transmit the user profile to the one or more servers via the I/O interface 339.

The streaming module 308 transmits audio streams to auditory devices based on the user preferences. For example, the streaming module 308 may transmit a first audio stream to a first auditory device based on first user preferences and a second audio stream to a second auditory device based on second user preferences where the first user preferences have at least one different user preference than the second user preferences. Each of the first audio stream and the second audio stream may be unicast streams. In some embodiments where the first user preferences and the second user preferences are the same, the streaming module 308 may transmit a broadcast stream to both the first auditory device and the second auditory device. In some embodiments, the streaming module 308 instructs the display 341 to include closed captioning when it is part of the user preferences.

In some embodiments, a user may override one or more of the user preferences. For example, the user may undo closed captioning each time it is automatically turned on. If a user overrides the one or more preferences a predetermined threshold number of times, the user profile module 306 may modify the one or more preferences to correspond to changes made by the user. Continuing with the example, if the user removes closed captioning more than three times (or two, five, etc.), the user profile module 306 may remove closed captioning as one of the user's preferences.

In some embodiments, when a second user overrides a user preference or directly changes a user preference, it results in the second user preferences matching first user preferences. In some embodiments, the streaming module 308 may switch from transmitting a separate first audio stream and a second audio stream to transmitting a broadcast stream to the first auditory device and the second auditory device.

Example Methods

Figure 5:
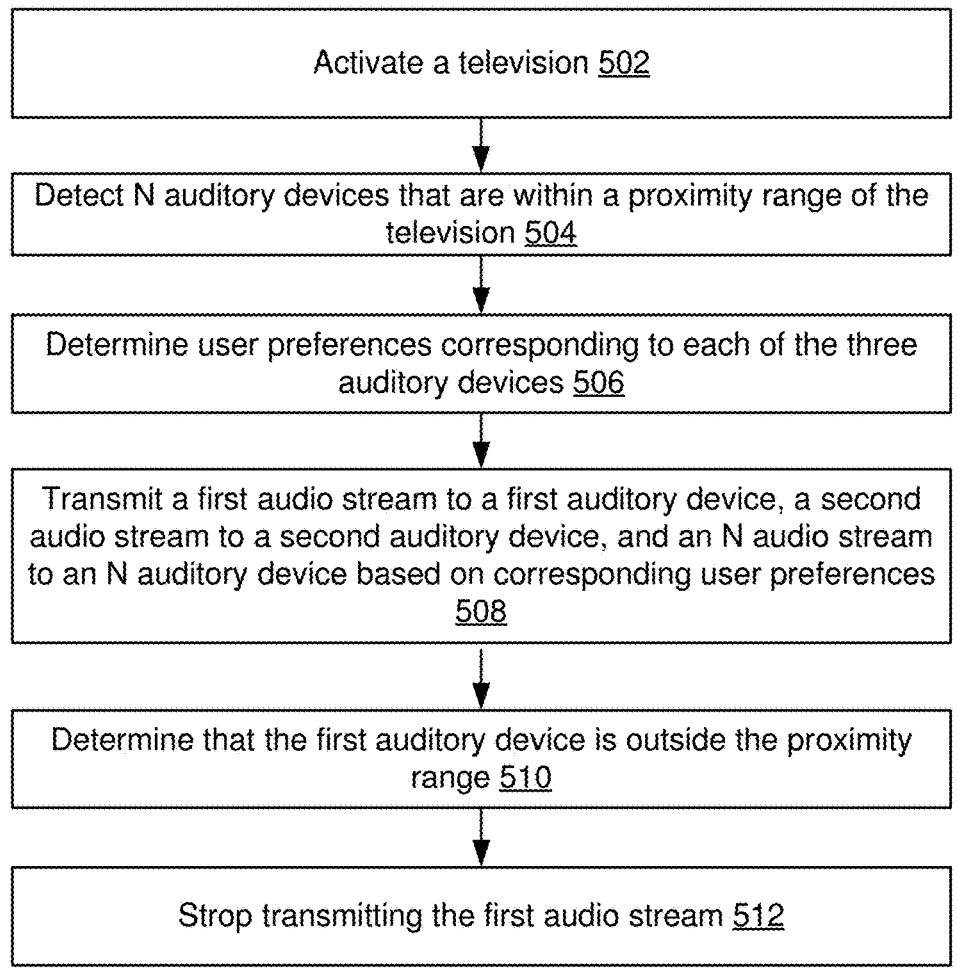
FIG. 5 illustrates a flowchart of an example method for a television to stream audio to auditory devices according to some embodiments described herein.

FIG. 5 illustrates a flowchart of an example method 500 for a television to stream audio to auditory devices. The method 500 may be performed by the computing device 300 in FIG. 3. For example, the computing device 300 may be the audio source 101 illustrated in FIG. 1. The computing device 300 includes a streaming application 107 that implements the steps described below.

The method 500 may begin at block 502. At block 502, a television is activated. For example, a user may turn the television on with a remote control, press a button on the television, etc. Block 502 may be followed by block 504.

At block 504, N auditory devices are detected that are within a proximity range of the television. For example, three auditory devices may be detected. Each of the auditory devices may connect the same way to the television or use different protocols to connect. For example, the first auditory device may connect using Bluetooth 5.1, the second auditory device may connect using Bluetooth LE Audio, and the third auditory device may use Wi-Fi to connect to the television. Block 504 may be followed by block 506.

At block 506, user preferences corresponding to each of the auditory devices are determined. For example, each user may select user preferences on the television or provide preferences to a user interface displayed on the user's user device. Block 506 may be followed by block 508.

At block 508, a first audio stream, a second audio stream, and an N audio stream are transmitted based on corresponding user preferences. For example, the first audio stream may include audio descriptive services, the second audio stream may include high quality audio for headphones, and a third audio stream may include standard quality audio for hearing aids and closed captioning is turned on for the television display. Block 508 may be followed by block 510.

At block 510, the first auditory device is determined to be outside the proximity range. For example, the first auditory device may exceed a predetermined distance threshold for a predetermined time threshold. Block 510 may be followed by block 512.

At block 512, the television stops transmitting the first audio stream to the first auditory device.

Figure 6:
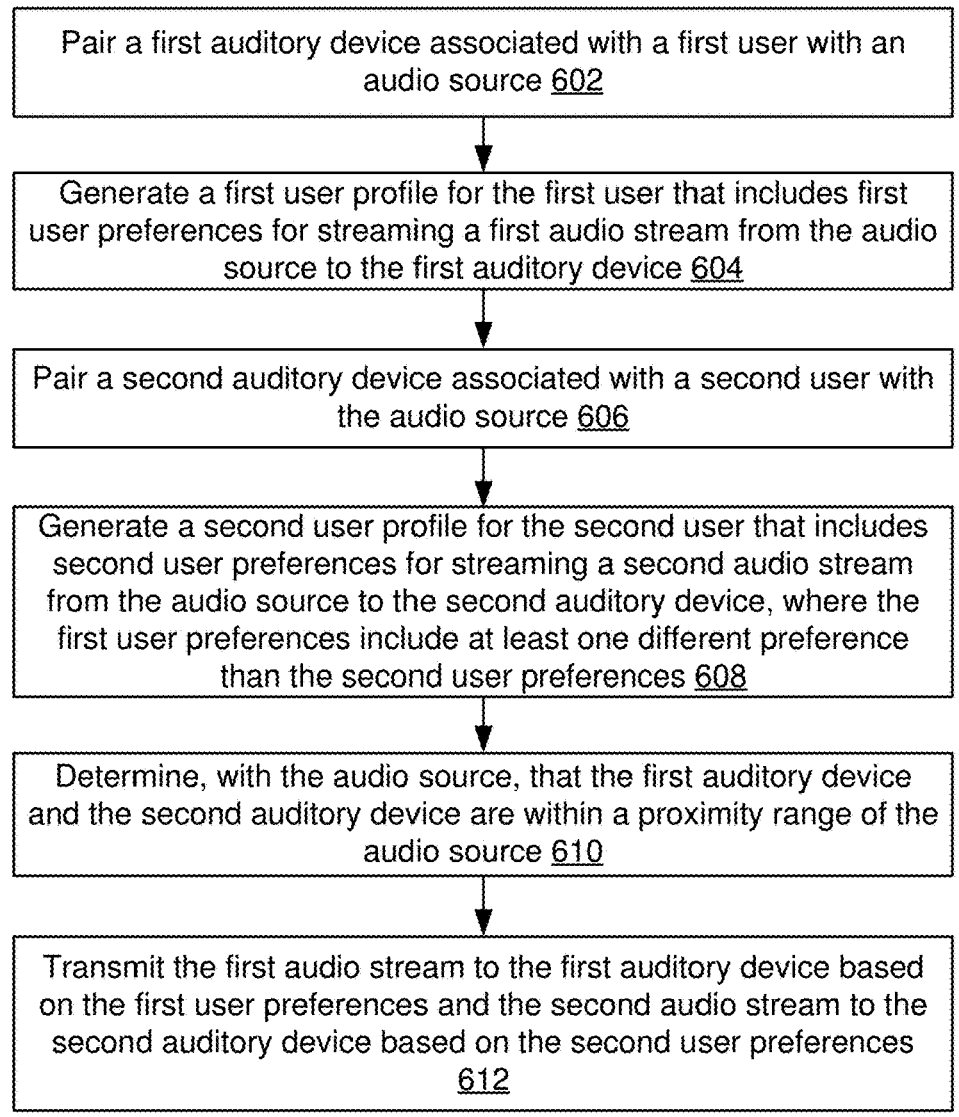
FIG. 6 illustrates a flowchart of an example method to stream audio according to some embodiments described herein.

FIG. 6 illustrates a flowchart of an example method 600 to stream audio. The method 600 may be performed by the computing device 300 in FIG. 3. For example, the computing device 300 may be the audio source 101 illustrated in FIG. 1. The computing device 300 includes a streaming application 107 that implements the steps described below.

The method 600 may begin at block 602. At block 602, a first auditory device associated with a first user is paired with an audio source. The audio source may be a television, a laptop, a tablet, a user device, etc. The first auditory device may be hearing aids, earbuds, headphones, etc. Block 602 may be followed by block 604.

At block 604, a first user profile is generated for the first user that includes first user preferences for streaming a first audio stream from the first auditory device. Block 604 may be followed by block 606.

At block 606, a second auditory device associated with a second user is paired with the audio source. Block 606 may be followed by block 608.

At block 608, a second user profile is generated for the second user that includes second user preferences for streaming a second audio stream from the audio source to the second auditory device. The first user preferences include at least one different preference than the second user preferences. Block 608 may be followed by block 610.

At block 610, the audio source determines that the first auditory device and the second auditory device are within a proximity range of the audio source. For example, the audio source may receive sensor data from a sensor, such as an IR sensor, a camera, an ultrasound sensor, etc. that the streaming application 107 uses to determine whether the first auditory device and the second auditory device are within the proximity range. Block 610 may be followed by block 612.

At block 612, the first audio stream is transmitted to the first auditory device based on the first user preferences and the second audio stream to the second auditory device based on the second user preferences.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:
    pairing a first auditory device associated with a first user with an audio source;
    determining that the first auditory device is a first type of device that supports a first type of audio; and
    generating graphical data for displaying a user interface with suggested user preferences based, at least in part, on the first auditory device being the first type of device supporting the first type of audio;
    generating a first user profile for the first user that includes a plurality of first user-selected preferences for streaming a first audio stream from the audio source to the first auditory device;
    pairing a second auditory device associated with a second user with the audio source;
    generating a second user profile for the second user that includes a plurality of second user-selected preferences for streaming a second audio stream from the audio source to the second auditory device, wherein the plurality of first user-selected preferences include at least one different preference than the plurality of second user preferences;
    determining, with the audio source, that the first auditory device and the second auditory device are within a proximity range of the audio source;
    transmitting, by the audio source via respective customized unicast streams, the first audio stream customized with the plurality of first user-selected preferences to the first auditory device and the plurality of second audio stream customized with the plurality of second user-selected preferences to the second auditory device;
    determining that the first auditory device is outside of the proximity range of the audio source for an amount of time that meets a predetermined time threshold, wherein the time threshold is determined by prior patterns of the first auditory device being inside the proximity range and outside of the proximity range for certain amounts of time; and
    ending transmission of the first audio stream based on the amount of time outside of the proximity range meeting the predetermined time threshold.

2. The computer-implemented method of claim 1, wherein the first type of device is a hearing aid, and wherein the suggested user preferences of the user interface are further based, at least in part, on a hearing loss profile of the first user to optimize the first audio stream and improve sound quality according to the hearing loss profile.

3. The computer-implemented method of claim 1, wherein the plurality of first user-selected preferences associated with the first user profile include at least one preference selected from the group of closed captioning, audio descriptive services, a quality of audio, spatial audio, flattened volume, one or more presets, and combinations thereof.

4. The computer-implemented method of claim 3, wherein the one or more presets include at least one preset selected from the group of a standard audio mode, a theater audio mode, a music audio mode, a news audio mode, a custom audio mode, a balance preset, and combinations thereof.

5. The computer-implemented method of claim 1, further comprising:
    determining that the plurality of second user-selected preferences are modified to match the plurality of first user-selected preferences; and switching the transmitting from the respective unicast streams to transmitting the first audio stream and the second audio stream customized with the plurality of first user-selected preferences, as a broadcast stream based on the plurality of second user-selected preferences matching the plurality of first user-selected preferences.

6. The computer-implemented method of claim 1, wherein determining that the first auditory device is within the proximity range is based on determining that the first auditory device is less than a predetermined distance threshold from the audio source.

7. The computer-implemented method of claim 1, wherein determining that the first auditory device is within the proximity range is based on sensor data from at least one sensor selected from the group of an infrared sensor, a light-emitting diode (LED), radar, a camera sensor, an ultrasonic sensor, and combinations thereof.

8. The computer-implemented method of claim 1, wherein the first audio stream and the second audio stream are transmitted using at least one communication method selected from the group of Bluetooth LE Audio, Bluetooth, Wi-Fi, ultra-wide band (UWB), near-field communication (NFC), and combinations thereof.

9. The computer-implemented method of claim 1, further comprising:
    generating graphical data for displaying a user interface that includes options for configuring the plurality of first user-selected preferences, wherein the first user profile is generated on a user device associated with the first user.

10. The computer-implemented method of claim 1, further comprising:
    determining that the first user overrides one or more of the plurality of first user-selected preferences a predetermined threshold number of times; and
    modifying the one or more of the plurality of first user-selected preferences to correspond to changes made by the first user.

11. The method of claim 1, further comprising:
    terminating a connection made by the pairing to stop the transmitting of the first audio stream based on detecting that the first user is outside of the proximity range for a predetermined period of time that is based, at least in part, on past first user behavior.

12. A system comprising:
    one or more processors; and
    logic encoded in one or more non-transitory media for execution by the one or more processors and when executed are operable to:
    pair a first auditory device associated with a first user with an audio source;
    determine that the first auditory device is a first type of device that supports a first type of audio; and
    generate graphical data for displaying a user interface with suggested user preferences based, at least in part, on the first auditory device being the first type of device supporting the first type of audio;
    generate a first user profile for the first user that includes a plurality of first user-selected preferences for streaming a first audio stream from the audio source to the first auditory device;
    pair a second auditory device associated with a second user with the audio source;
    generate a second user profile for the second user that includes a plurality of second user-selected preferences for streaming a second audio stream from the audio source to the second auditory device, wherein the plurality of first user-selected preferences include at least one different preference than the plurality of second user-selected preferences;
    determine, with the audio source, that the first auditory device and the second auditory device are within a proximity range of the audio source;
    transmit, by the audio source via respective customized unicast streams, the first audio stream customized with the plurality of first user-selected preferences to the first auditory device and the plurality of second audio stream customized with the plurality of second user-selected preferences to the second auditory device;
    determining that the first auditory device is outside of the proximity range of the audio source for an amount of time that meets a predetermined time threshold, wherein the time threshold is determined by prior patterns of the first auditory device being inside the proximity range and outside of the proximity range for certain amounts of time; and
    ending transmission of the first audio stream based on the amount of time outside of the proximity range meeting the predetermined time threshold.

13. The system of claim 12, wherein the logic is further operable to:
    wherein the first type of device is a hearing aid, and
    wherein the suggested user preferences of the user interface include are further based, at least in part, on a hearing loss profile of the first user to optimize the first audio stream and improve sound quality according to the hearing loss profile.

14. The system of claim 12, wherein determining that the first auditory device is within the proximity range is based on determining that the first auditory device is less than a predetermined distance threshold from the audio source.

15. Software encoded in one or more non-transitory computer-readable media for execution by the one or more processors and when executed cause the one or more processors to perform operations comprising:
    pairing a first auditory device associated with a first user with an audio source;
    determining that the first auditory device is a first type of device that supports a first type of audio; and
    generating graphical data for displaying a user interface with suggested user preferences based, at least in part, on the first auditory device being the first type of device supporting the first type of audio;
    generating a first user profile for the first user that includes a plurality of first user-selected preferences for streaming a first audio stream from the audio source to the first auditory device;
    pairing a second auditory device associated with a second user with the audio source;
    generating a second user profile for the second user that includes a plurality of second user-selected preferences for streaming a second audio stream from the audio source to the second auditory device, wherein the plurality of first user-selected preferences include at least one different preference than the plurality of second user-selected preferences;
    determining with the audio source, that the first auditory device and the second auditory device are within a proximity range of the audio source;
    transmitting, by the audio source via respective customized unicast streams, the first audio stream customized with the plurality of first user-selected preferences to the first auditory device and the plurality of second audio stream customized with the plurality of second user-selected preferences to the second auditory device;

determining that the first auditory device is outside of the proximity range of the audio source for an amount of time that meets a predetermined time threshold, wherein the time threshold is determined by prior patterns of the first auditory device being inside the proximity range and outside of the proximity range for certain amounts of time; and ending transmission of the first audio stream based on the amount of time outside of the proximity range meeting the predetermined time threshold.

16. The software of claim 15, wherein the first type of device is a hearing aid, and wherein the suggested user-selected preferences of the user interface include are further based, at least in part, on a hearing loss profile of the first user to optimize the first audio stream and improve sound quality according to the hearing loss profile.

17. The software of claim 15, wherein the plurality of first user-selected preferences associated with the first user profile include at least one preference selected from the group of closed captioning, audio descriptive services, a quality of audio, spatial audio, flat volume, one or more presets, and combinations thereof.

18. The software of claim 17, wherein the one or more presets include at least one preset selected from the group of a standard audio mode, a theater audio mode, a music audio mode, a news audio mode, a custom audio mode, and combinations thereof.

19. The software of claim 15, wherein determining that the first auditory device is within the proximity range is based on determining that the first auditory device is less than a predetermined distance threshold from the audio source.

* * * * *